Oct. 14, 1969 W. A. ERNST 3,473,088
PRESSURE-ACTIVATED FUSE FOR ELECTRICAL COMPONENTS
Filed Sept. 15, 1966

INVENTOR
WILHELM A. ERNST
BY Philip M. Bolton
ATTORNEY

# United States Patent Office 3,473,088
Patented Oct. 14, 1969

3,473,088
PRESSURE-ACTIVATED FUSE FOR
ELECTRICAL COMPONENTS
Wilhelm August Ernst, Nuremberg, Germany, assignor to International Standard Electric Corporation, New York, N.Y., a corporation of Delaware
Filed Sept. 15, 1966, Ser. No. 579,654
Claims priority, application Germany, Oct. 19, 1965, St 24,528
Int. Cl. H02h 7/16; H01g 1/00
U.S. Cl. 317—12                                   10 Claims

ABSTRACT OF THE DISCLOSURE

This is a pressure activated internal safety fuse for a sealed electrical component fused to a casing having a pressure-movable portion coupled to a cutting member. The movable portion is deflected by an excessive rise of internal pressure and cuts into at least one terminal lead of the component, either (i) severing said lead thereby rapidly disconnecting the component from its circuit or (ii) short-circuiting at least two leads of the component together, thereby to initiate shut-off of the component by external current-activated fusing.

---

Figure 1:
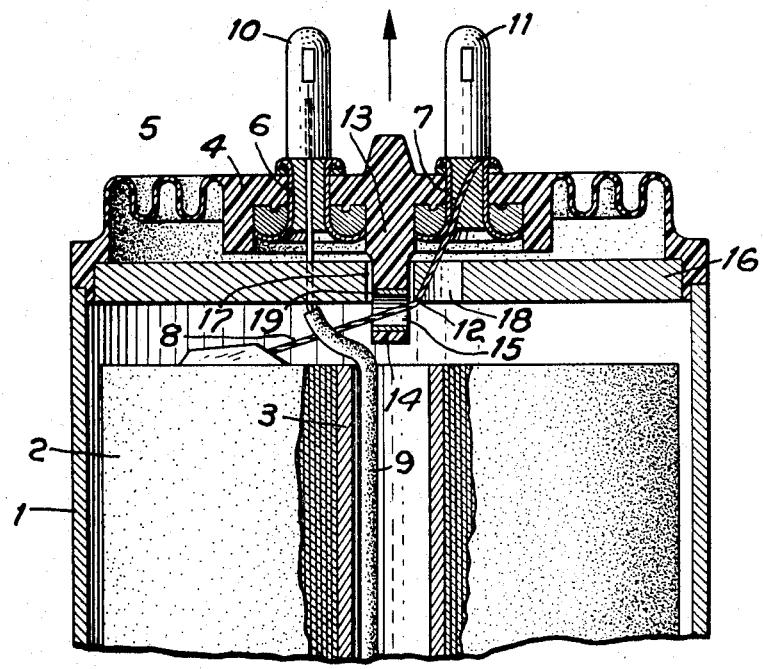

The present invention relates to means for protecting apparatus from damage due to excessive internal pressures in electrical components, and more particularly to a novel fuse for precipitating cessation of circuit operation when such a component is subjected to excessive internal pressure.

Whenever an electrical component is installed in a sealed casing, the danger exists that an excessive pressure may be built up by fluids contained in said casing or by gases released when the component is heated to excessive temperatures. When the pressure builds up to a value beyond the strength of the casing, failure of the casing will occur, either by development of a localized puncture therein or by explosion thereof. In either case, the fluid contained in the casing will escape, and may corrode the surrounding apparatus or even start a fire. Some electrical components, particularly electrolytic capacitors, have been known to explode with such force that the surrounding apparatus has been greatly damaged and serious injury to personnel has resulted.

Previous attempts have been made to solve this problem by providing the component casing with a flexible diaphragm as one portion thereof; when excessive internal pressure is developed, the diaphragm expands and pulls a tear strip loose from a wall of the casing, thus breaking one of the terminal leads of the device. Mechanisms of this type are disclosed, e.g., in German Patent Nos. 974,715; 975,024 and 975,029. These arrangements, however, disengage the component terminal lead by means of a tearing action which results in considerable arcing as the lead is disconnected. Moreover, the mechanisms involved are quite complicated and of dubious reliability, since they are usually not capable of withstanding the shock, pressure and vibration forces to which the apparatus containing such components may be subjected.

Accordingly, an object of the present invention is to provide a simple, effective and reliable pressure-activated internal safety fuse for sealed electrical components.

Another object of the invention is to provide such a safety fuse wherein a cutting action is employed to precipitate a drastic change in impedance between at least two terminal leads of such component, thereby to precipitate disconnection of the component from surrounding apparatus.

These, and other objects which will become apparent by reference to the following detailed description taken in conjunction with the accompanying drawings and appended claims, are achieved by providing the electrical component to be fused with a casing having a pressure-movable portion coupled to a cutting member which, upon deflection of the movable portion by excessive internal pressure rise within the casing, cuts into at least one terminal lead of the component, either (i) severing said lead or (ii) short-circuiting at least two leads of the component together, thereby to initiate shut-off of the apparatus by external current-activated fusing.

Figure 2:
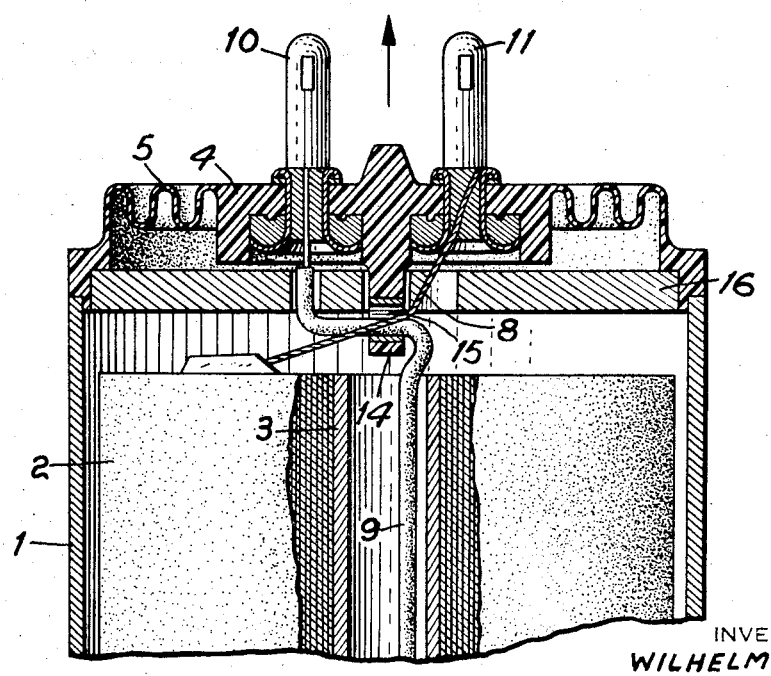

The invention will be best understood by reference to the following detailed description taken in conjunction with the accompanying drawings, in which:

FIGURE 1 shows an electrolytic capacitor in longitudinal cross section incorporating a pressure-activated safety fuse according to the invention; and FIGURE 2 shows an alternative embodiment of the invention incorporated in the capacitor of FIGURE 1.

The capacitor shown in FIGURES 1 and 2 comprises a reel 2 which is arranged inside a casing 1, e.g. a metal casing, with the winding tapes of this reel 2 being wound onto a sleeve 3. The casing 1 is sealed in a gastight manner by a lid or cover 4 which, at its face side 5, is designed in a diaphragm-like manner, e.g. as a bellows. In order that the lid 4 should be capable of expanding in the event of an excessive pressure rise, it is made of elastic material, e.g. a thermoplastic material. The lid contains two grommets 6 and 7 by means of which the ends of the terminal leads 8 and 9, each leading to one plate of the capacitor, are soldered in a gastight manner. Connected to the grommets 6 and 7 are two soldering lugs 10 and 11 to which external apparatus may be connected. Of the two terminal leads, the one indicated by the reference numeral 8 serves as the fuse wire which may be cut at the cutting edge 12 by the device arranged inside the casing whenever the pressure therein increases excessively and the lid 4 is outwardly deflected. The fuse wire 8 is not insulated and consists preferably of several thin twisted individual wires. The other terminal lead 9, however, is insulated, and is connected to the capacitor plate projecting out of the capacitor reel at the bottom of the casing.

The device for cutting the fuse wire 8 consists of (i) a member 13 projecting into the inside of the casing and which, at its free end 14, is provided with a transversely directed sharp-edged bore 15, and of (ii) a sealing disk 16 which is stationarily arranged between the lid 4 of the casing and the capacitor reel 2, the disk 16 being provided with a sharp-edged hole 17. According to FIGURE 1, the fuse wire 8 is led as tightly as possible through the bore 15 and the hole 18 of the sealing disk 16, so as to be under tension after being soldered to the bushing 7. This insures a rapid separation of the ends of the cut fuse wire. The member 13 of the lid 4 of the casing is arranged to be longitudinally movable within the tightly fitting hole 17, and projects with its free end 14 extending out of the sealing disk. In cases where the lid 4 is moved outward due to a pressure rise inside the capacitor casing, the member 13 is moved in the direction indicated by the arrow, so that both the bore 15 and the hole 17 cooperate to cut the fuse wire at the cutting edge 12. Thus, the capacitor is disconnected from its circuit and any possible gas development is stopped. It is preferable for the cutting edge 12 of the hole 17 to extend an acute angle in order to insure a rapid cutting action. This is accomplished by correspondingly shaping the aperture 18. For the same reason it is advantageous to fit a sharp-edged metal bushing 19 into the bore 15. In this way the electric arc produced when cutting the fuse wire is rapidly extinguished, so that the fuse is suitable for use at higher voltages. For effecting a free movement of the lid or cover of the casing, the second terminal lead 9, which is insulated, is positioned in a wide loop around the member 13 of the lid 4 of the casing.

In the alternative embodiment shown in FIGURE 2, the same parts are used as in the example described. In this case, however, the insulated terminal lead 9 is also led through the bore 15. In the case of a lid movement due to a pressure rise inside the casing, the insulation of terminal lead 9 is cut through and a short circuit is caused between the now bare connecting leads 8 and 9. This short circuit may be utilized for causing certain parts of the apparatus to respond. For example, a conventional overcurrent protective fuse may be employed to disconnect the capacitor from its associated circuitry.

The advantages achievable by the present invention reside primarily in the fact that only a small number of simple construction elements are required for building a reliable functioning protective device. In addition, the protective device, according to the present invention, insures a rapid disconnection of the affected component, thus preventing the evolution of metal vapors and electric arcs at the cutting point. Finally, due to its simple construction, the invention is insensitive to severe mechanical stresses.

While the principles of this invention have been described above in connection with specific embodiments, and particular modifications thereof, it is to be clearly understood that this description is made only by way of example and not as a limitation on the scope of the invention.

I claim:
1. An electrical component fused against internal pressure in excess of a given maximum permissible value, comprising:
   an electrical element;
   a sealed casing surrounding said element, said casing having a movable portion deflectable by an increase of the pressure exerted thereon by any fluid in said casing;
   first and second terminal leads extending from said casing to said element; and
   cutting means coupled to said movable portion at least one of said leads being held in tension against said cutting means to provide a sudden and substantial change in the impedance between said leads when said fluid pressure exceeds said maximum permissible value.
2. A component according to claim 1, wherein said cutting means comprises:
   a first member affixed to said movable portion; and
   a stationary second member within said casing adjacent said first member such that a part of said first lead is disposed between said members,
   said part being cuttable by relative movement between said members.
3. A component according to claim 2, wherein said first lead extends into a recess in said first member, an edge of said recess cooperating with said second member to shear said part.
4. A component according to claim 3, wherein said second member is wedge-shaped.
5. A component according to claim 2, further comprising a sealing disk disposed between said element and said wall portion, said first lead extending through an aperture in said disk.
6. A component according to claim 5, wherein said first member is slidably movable within a close-fitting hole in said disk, said part being cuttable at the interface between said first member and said hole.
7. A component according to claim 6, wherein said second member comprises a wedge-shaped portion of said disk disposed between said aperture and said hole.
8. A component according to claim 6, wherein said first member has a sharp-edged bushing disposed within said recess.
9. A component according to claim 2, wherein said part of said first lead is insulated and a part of said second lead is disposed between said members, the relative movement between said members serving to cut said insulation thereby to short-circuit said first lead to said second lead.
10. A component according to claim 9, wherein said leads extend into a recess in said first member, an edge of said recess cooperating with said second member to short-circuit said leads together.

References Cited
UNITED STATES PATENTS

| | | | |
|---|---|---|---|
| 2,896,049 | 7/1959 | Maier | 317—256 X |
| 3,235,778 | 2/1966 | Myers et al. | 317—12 X |
| 3,246,205 | 4/1966 | Miller | 317—12 |

JOHN F. COUCH, Primary Examiner

J. D. TRAMMELL, Assistant Examiner

U.S. Cl. X.R.

317—256